C. A. HUSE & J. L. MILLER.
BONDING FISH PLATE.
APPLICATION FILED FEB. 18, 1910.
979,860. Patented Dec. 27, 1910.
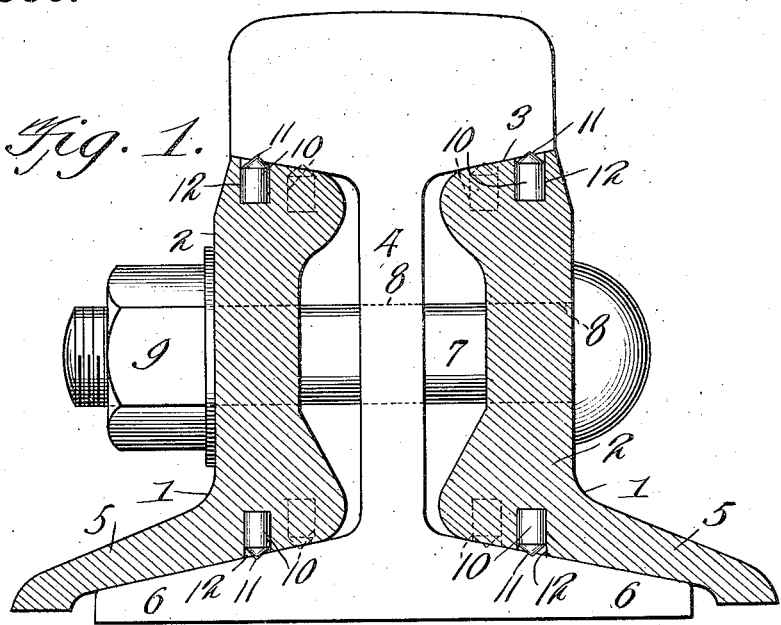
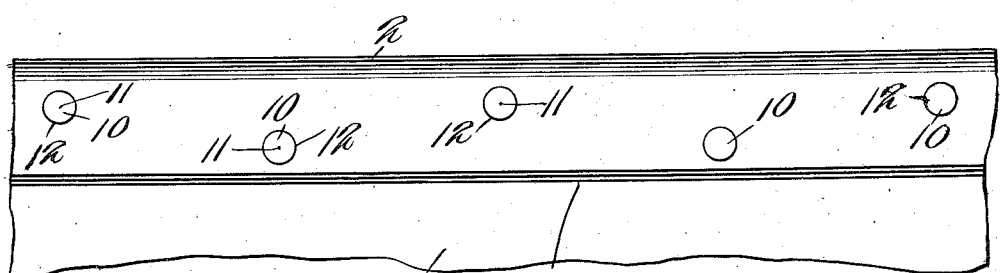
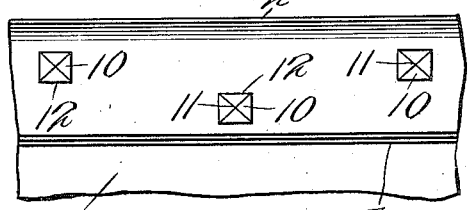
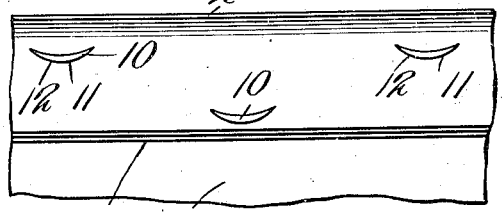
Witnesses
Frank B. Hofman
D. W. Gould
Inventors
Charles A. Huse,
James L. Miller,
By Victor J. Evans
Attorney

UNITED STATES PATENT OFFICE.

CHARLES A. HUSE, OF WILLIAMSPORT, AND JAMES L. MILLER, OF LEWISBURG, PENNSYLVANIA.

BONDING FISH-PLATE.

979,860.

Specification of Letters Patent. Patented Dec. 27, 1910.

Application filed February 18, 1910. Serial No. 544,707.

*To all whom it may concern:*

Be it known that we, CHARLES A. HUSE and JAMES L. MILLER, citizens of the United States, residing at Williamsport and Lewisburg, respectively, in the counties of Lycoming and Union, respectively, and State of Pennsylvania, have invented new and useful Improvements in Bonding Fish-Plates, of which the following is a specification.

The invention relates to an improved rail bond, being more particularly directed to a rail bonding fish plate, in which the ordinary fish plate, otherwise of usual construction and function, is provided with means whereby in its usual function a perfect metallic contact is secured and maintained between the fish plate and adjacent rails.

In the usual construction and function the fish plate is ineffective as a bond owing to the fact that the elements speedily induce a coating of rust between the fish plate and rails with the effect to destroy any electrical contact between such parts.

It is therefore the object of the present invention to provide the rail-engaging surfaces of the fish plate with hardened cutting members which, in the proper seating of the fish plates to connect the rail ends, will cut into the surfaces of the rails with the effect to provide that metallic contact between the fish plate and rails essential to their electrical connection.

A further object is the provision of cutting elements so arranged that a continual cutting or rubbing action is had between said elements and the rail material during the independent movements of the rail and fish plate incident to the expansion and contraction of the former and the travel of a train over the juncture, whereby the contact is maintained sharp and bright with the most effective results.

The invention in its preferred details of construction will be described in the following specification, reference being had particularly to the accompanying drawings, in which:—

Figure 1 is a transverse view through the improved fish plates, with the rail in elevation. Fig. 2 is a broken plan of the fish plate showing the preferred form of cutting elements. Fig. 3 is a similar view showing another form of cutting elements. Fig. 4 is a similar view showing another form of cutting elements. Fig. 5 is an elevation of the cutting elements shown in Fig. 3. Fig. 6 is a perspective of the cutting elements shown in Fig. 4.

Referring particularly to the accompanying drawings, it will be noted that the fish plates 1 are of the usual accepted type including the upright section 2 designed to bear beneath the tread portion 3 of the rail 4, and the flange portion 5 designed to overlie and bear upon the base flanges 6 of the rails. As is usual in this connection the opposing fish plates are secured in place by bolts 7 designed to pass through openings 8 in the plates and rails and engaged beyond one of the plates by nuts 9. Owing to the curved formation of the upright portions 2 of the fish plates there is a slight wedging or spreading action between the rail heads and base flanges in the tightening of the nut to draw the base plates into proper position.

The present invention consists in applying a series of cutting elements 10 to the tread-engaging end of the upright section of the fish plate, and to the base flange-engaging surface of said plates. These elements in the preferred form are cylindrical bodies of tool or otherwise hardened material having their upper ends shaped to provide cutting points 11. The elements are secured in the fish plates in the surfaces noted, preferably by forming recesses in said surfaces, as at 12, in which the cutting elements are fixedly secured in any usual or preferred manner.

In the use of the improvement the fish plates in being drawn to place through the tightening of the nut will cause the points 11, which extend slightly beyond the surfaces of the fish plate, to cut their way through and into the material of the rails forming a channel on the terminal end of which the point of each element is so embedded as to secure the most effective metallic contact for providing an electrical connection. In the slight independent movements to which the rail ends and fish plates are subjected in the jars incident to the travel of the train and in the expansion and contraction of the rails, said points will be forced to further grind and cut the material of the rails with the effect to continuously and automatically brighten and sharpen the contact.

The shape or arrangement of the cutting elements are not material so far as the present invention is concerned, as we contemplate the formation of these points and their arrangement in any preferred detail. For example, the elements may have angular bodies, as shown in Fig. 5, or they may be crescent shaped or of other curved form in plan, as shown in Fig. 6. In the use of elements having their cutting edges in the form of straight or curved lines they will be preferably arranged so that their maximum dimension will be in practical parallelism with the rails, in order to insure a continuous cutting operation during the expansion and contraction of the rail. It is also preferred that the elements be arranged in staggered order longitudinally of the fish plate surfaces, though it is to be understood that they may be arranged in any other desired order and in any number best adapted to the particular conditions.

The salient feature of the present invention resides in the application of a rail cutting element to the rail-engaging surfaces of a fish plate, so that in the application of the fish plate said elements will cut their way into the rail, with the effect noted, and while the above details are preferred, it is to be understood that they indicate simply a structural embodiment of the invention.

Having thus described the invention, what is claimed as new, is:—

1. A bonding fish plate and a rail cutting element carried thereby.

2. A bonding fish plate and means carried thereby to cut into the material of the rail during the application of the fish plate.

3. A bonding fish plate and a series of cutting elements carried thereby and projecting beyond the rail-engaging surfaces of said fish plate.

4. A bonding fish plate, and independent cutting elements fixedly secured in the rail-engaging surfaces of said fish plate.

5. A bonding fish plate, and means carried thereby to cut the material of the rail in any independent movement of the rail or fish plate.

6. A bonding fish plate, and a cutting element carried by the fish plate and projecting beyond the tread-engaging surface of the fish plate.

7. A bonding fish plate, a cutting element carried by and projecting beyond the rail tread-engaging portion of the fish plate, and a cutting element carried by and projecting beyond the rail base flange-engaging surface of the fish plate.

8. A bonding fish plate formed with an opening in a rail-engaging surface, and a cutting element fixedly secured in said opening and having a cutting portion projecting beyond the adjacent surface.

9. A bonding fish plate formed in a rail-engaging surface with a series of openings, and an independent rail-engaging cutting element secured in each of said openings.

In testimony whereof we affix our signatures in presence of two witnesses.

CHARLES A. HUSE.
JAMES L. MILLER.

Witnesses:
DAVID W. GOULD,
JOHN L. FLETCHER.